No. 12,358. REISSUED JUNE 13, 1905.
O. A. MYGATT.
PRISM GLASS SHADE REFLECTOR.
APPLICATION FILED SEPT. 9, 1904.
2 SHEETS—SHEET 1.
FIG. 1.
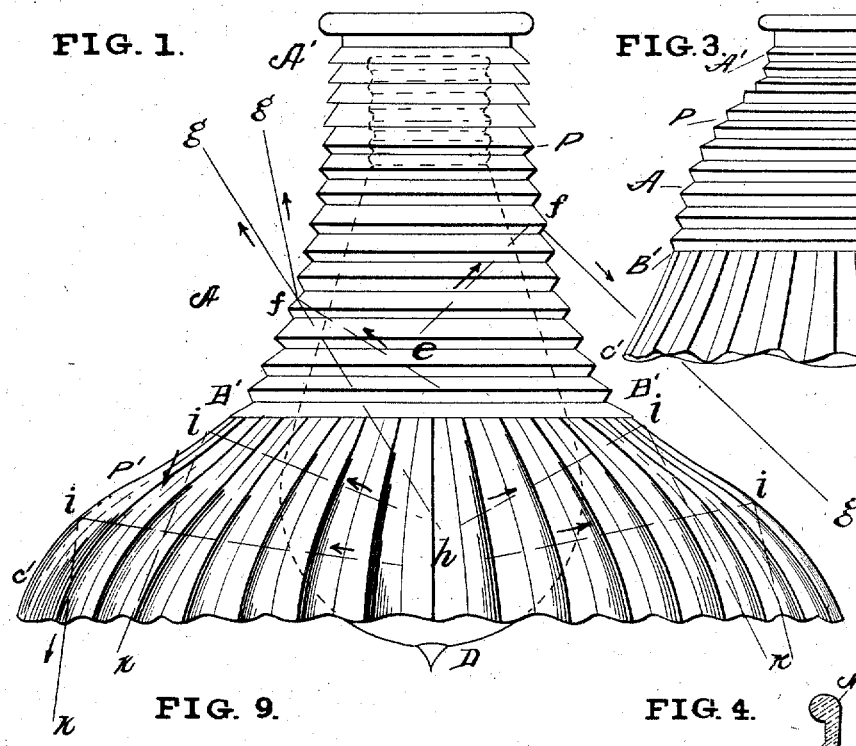
FIG. 3.
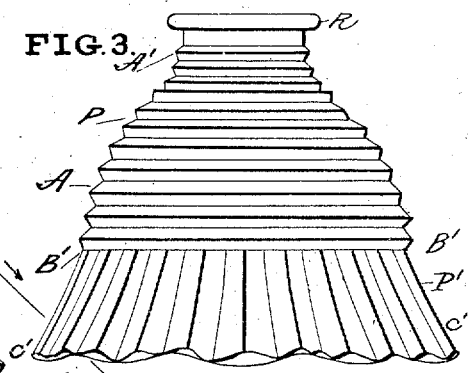
FIG. 9.
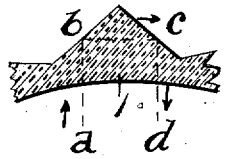
FIG. 6.
FIG. 4.
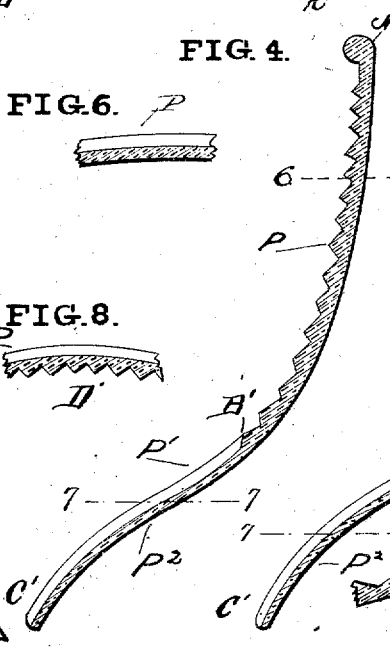
FIG. 5.
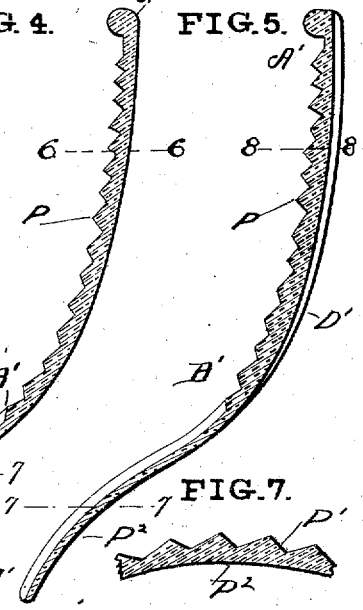
FIG. 2.
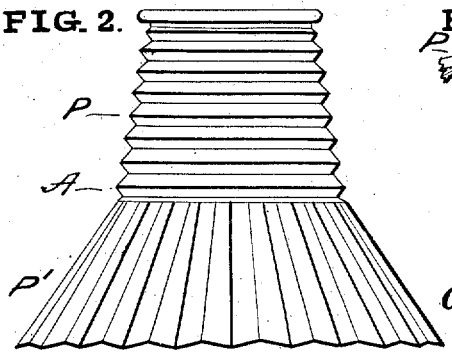
FIG. 8.
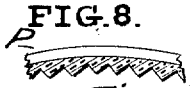
FIG. 7.
WITNESSES:
Chas. K. Davies.
John A. Daly.
INVENTOR
Otis A. Mygatt
BY W. A. Bartlett
Attorney No. 12,358. REISSUED JUNE 13, 1905.

O. A. MYGATT.

PRISM GLASS SHADE REFLECTOR.

APPLICATION FILED SEPT. 9, 1904.

2 SHEETS—SHEET 2.

Inventor

O. A. Mygatt

Witnesses

Chas. N. Davis.

Robert W. Gilb.

By W. A. Bartlett,

Attorney

No. 12,358. Reissued June 13, 1905.

UNITED STATES PATENT OFFICE.

OTIS A. MYGATT, OF NEW YORK, N. Y

PRISM-GLASS SHADE-REFLECTOR.

SPECIFICATION forming part of Reissued Letters Patent No. 12,358, dated June 13, 1905.

Original No. 763,688, dated June 28, 1904. Application for reissue filed September 9, 1904. Serial No. 223,908.

*To all whom it may concern:*

Be it known that I, OTIS A. MYGATT, a citizen of the United States, residing at New York, in the county of New York and State of New York, have invented certain new and useful Improvements in Prism-Glass Shade-Reflectors; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to prism-glass shades and reflectors or shade-reflectors for artificial lights.

The object of the invention is to produce in a single piece a prism-glass structure one part of which shall act as a reflector and another part of which shall act to radiate or diffuse the light-rays, at the same time controlling their direction to a greater or lesser extent.

Figure 10:
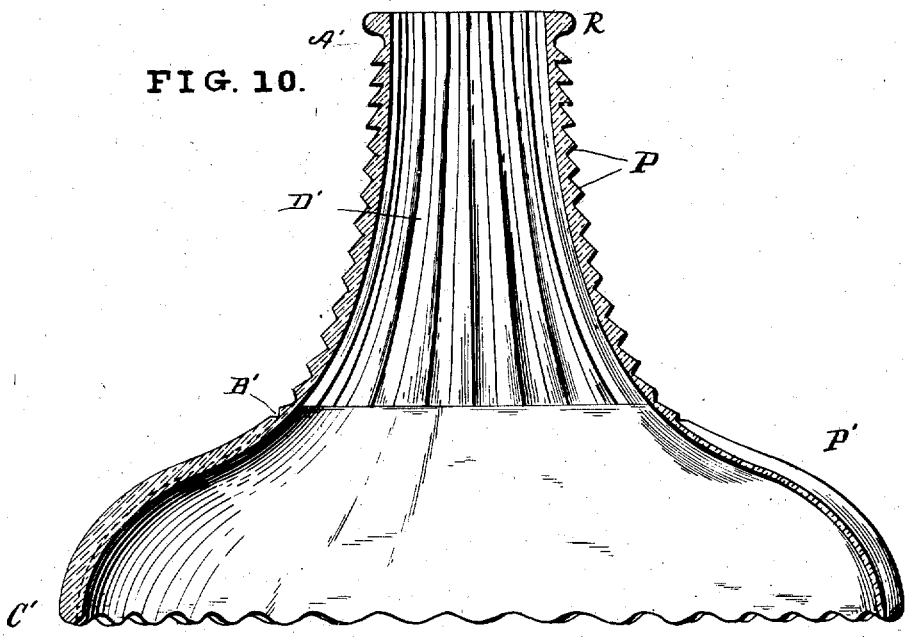
Figure 11:
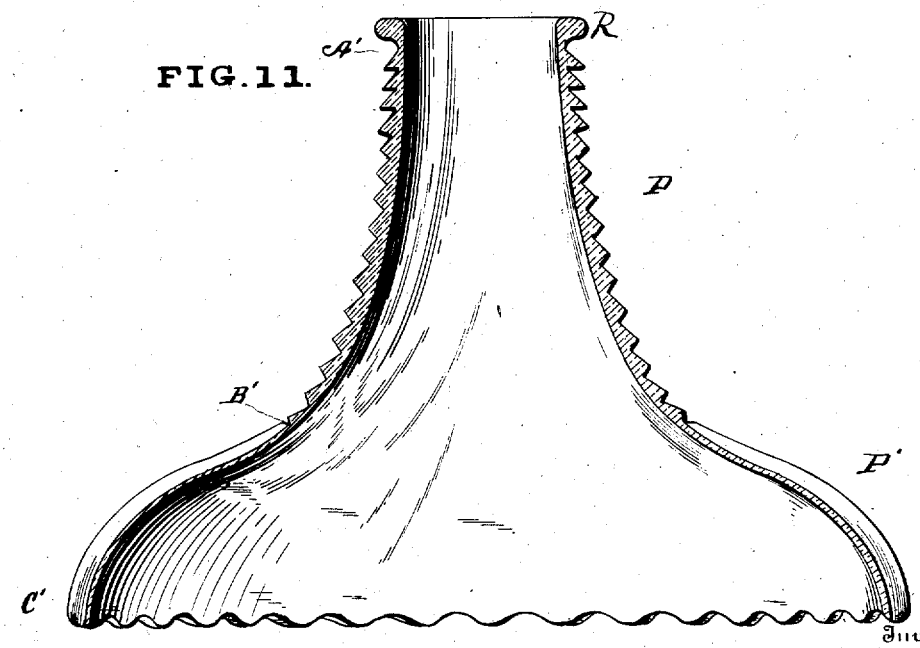

Figure 1 is a side elevation of a shade and reflector as applied to an electric lamp and illustrating the principles of the present invention. Figs. 2 and 3 are similar views of other forms of such shades or reflectors. Fig. 4 is a vertical section of the shade, Fig. 1, and Fig. 5 is a similar section of a modification. Fig. 6 is a broken section on line 6 6, Fig. 4. Fig. 7 is a broken section on line 7 7, Figs. 4 and 5. Fig. 8 is a broken section on line 8 8, Fig. 5. Fig. 9 is a sectional diagram illustrating direction of a reflected light-ray in connection with a glass prism. Fig. 10 is a vertical section of an entire shade-reflector, being an elaboration illustrating the species of Fig. 5; and Fig. 11 is a similar section showing the generic form of shade-reflector, being an elaboration of Fig. 4.

In the patent of Blondel and Psaroudaki, No. 563,836, of July 14, 1896, much information may be found as to the effect of prisms on light-rays, as also in my patent of December 3, 1901, No. 687,848. I avail myself of known laws and inventions therein set forth and of my subsequent improvements in carrying out my present invention.

In my Patent No. 763,689, of June 28, 1904, for a species of the generic invention involved in the present application the double-reflecting or longitudinal prisms are of like general character with those of the present application; but in the present application the circumferential prisms surrounding the upper part of the shade-reflector are diffusing or distributing prisms and may be of the character described in Patent No. 563,836, which may be either reflecting or refracting and are broadly claimed, while in my Patent No. 763,689 the claims are limited to "single-reflecting" prisms, which are not in the ordinary sense diffusing-prisms.

As shown in Figs. 1 and 3 of the accompanying drawings and in the sections Figs. 4 and 5, the light-diffusing portions of the shade-reflector vary in construction and are not limited to a single shape or form.

In Fig. 9 I show the approximate direction of a light-ray in entering and leaving a reflecting-prism on the reflecting portion of the reflector-shade. The light is supposed to emanate from the direction *a*, to enter the glass 1 in the direction *a b*, and to encounter the surface *b* at an angle of forty-five degrees. The ray is deflected ninety degrees in the line *b c* and again deflected at the surface *c* by a like prismatic surface to take the direction *c d*. The direction *c d* being parallel to the direction *a b*, the light-ray may be said to be reflected or turned back in a practically straight line. By covering the entire outer surface of a transparent-glass reflector with prisms of proper form as much as eighty-five per cent. of the light may be reflected or thrown back from the inner surface of the reflector.

A metallic or silvered-glass reflector of usual form transmits no light; but in many instances it is desirable to transmit some of the light through the reflecting-shade, while reflecting most of the other light-rays, and a prismatic reflector in which the entire outer surface of the structure is covered with reflecting-prisms often fails to transmit as much light through the reflector as is desirable. I have therefore devised a compound or combined shade and reflector composed of a single piece of transparent or slightly-tinted glass, and on the outer surface thereof I arrange both reflecting and refracting prisms, as I will now explain.

In Fig. 1, A represents a combined shade and reflector or shade-reflector of bell shape involving the principles of my invention. The outer surface of this article is covered with prisms. As usual in reflectors, a ring or collar R surmounts the device for attachment to a supporting-fixture. Below this ring or collar the body from A′ to B′ is shown as covered with circumferential prisms P, which are constructed to radiate and diffuse the light, as explained, for instance, in the patent to Blondel and Psaroudaki, No. 563,836, of July 14, 1896. From B′ to C′ the outer surface of the structure is covered with reflecting-prisms P′ of the general character hereinbefore described and arranged vertically or longitudinally with reference to the axis of the shade.

Light-rays emanating from an electric or other artificial light inclosed within the shade-reflector, as at D, Fig. 1, will in a general way be directed as follows: The zone of diffusion A′ B′ will receive the rays in the direction *e f* and will diffuse or transmit such rays in the direction *f g f g*, according to the structure of the prisms, as explained in the above-cited patent. The rays of light will reach the reflector-surface B′ C′, say, in the direction *h i* and will be reflected from the open mouth of the reflector in the direction *i k*. Thus the "bell-mouth," if such it may be called, is a reflector, while the upper part A′ B′ of the bell is a refractor or transmitter of light. Such a shade-reflector will when suspended "throw down" a large portion of the light received from an inclosed lamp and will at the same time diffuse light enough in its immediate vicinity to prevent dense shadows.

As illustrated, it will appear that different parts of the diffusion portion A′ B′ of my shade-reflector may be provided with different structural arrangements of the glass medium for transmitting and diffusing light, or the diffusion portion may be of like general character throughout its entire surface, it being understood that the light-rays which pass through this part of the shade-reflector largely receive their final direction from the light-directing surfaces on this part of the device.

The inside $P^2$ of the reflector portion P′ of the device illustrated is smooth as far as the zone B′ C′ is concerned. (See Fig. 4 and Fig. 11.) To soften the light, however, the inside of the shade or diffusion portion A′ B′ of the shade-reflector may also be supplied with longitudinal or vertical ribs, as shown at D′, Figs. 5, 8, and 10, and as more fully explained in the Blondel patent cited.

These shade-reflectors are made by pressing in molds in manner well understood by workers in glass. The molds are constructed of exact shape to receive and form the glass, which is worked in a hot plastic or molten condition.

The area of the structure devoted to transmission and diffusion of light and the area devoted to the reflection of light will naturally depend on the requirements of the case. In Figs. 2 and 3 I illustrate different forms of structures and having different superficial surfaces devoted to the different qualities of prisms. Numerous other forms can readily be devised having the same object in view.

In Fig. 1 the diffusion portion of the shade-reflector surrounds the smaller part of incandescent lamp D, leaving but little space between, while the reflector portion flares out over the larger part of said lamp. The least luminous part of the lamp is thus utilized for light diffusion and the part most luminous for reflection. To obtain an equally effective result from a reflector in which the reflector expands at a proper angle to be very effective and beginning as a reflector near the top of lamp D would require a large, heavy, and cumbersome reflector—such, for example, as is illustrated in Fig. 1 of my Patent No. 705,426, of July 22, 1902.

It will be observed that the reflecting-prisms on the flared portion B′ C′ of the shade-reflector are substantially longitudinal prisms. The prisms receive the light from the source of illumination within the shade-reflector and divert it out of the mouth of the reflector. After leaving the reflecting-prisms the light-rays do not again pass through any portion of the shade or reflector, because they are directed out of the open mouth of the reflector. The diffused rays from the diffusion-surface of the glass shade pass once through the glass and are at once diffused and do not again encounter any portion of the shade-reflector. The direction of the diffused rays is outward, not downward, to such an extent as to strike the reflector-body.

In the patent to Blondel and Psaroudaki, No. 563,836, of July 14, 1896, provision is made to a very limited extent for the reflection of light-rays from a part of the globe by means of external circumferential reflecting-prisms, which prisms reflect light in rings back into the globe and the same reflected light-rays are afterward refracted or diffused from other parts of the globe by refracting-prisms or diffusing-ribs, or both. The aforesaid patentees do not provide for a reflection of light-rays by means of external longitudinal prisms.

I do not herein claim a shade-reflector having its outer surface in part covered with double-reflecting prisms and in part with single-reflecting prisms, as the same is described and claimed in my Patent No. 763,689, dated June 28, 1904.

What I claim is—

1. An integral shade-reflector of glass, having external diffusing-prisms on the upper part of its body, opposite interior diffusing-prisms, and external reflecting-prisms opposite an interior smooth surface on its lower body portion.

2. An integral shade-reflector of glass having an annular body and flaring mouth, the body being practically covered with external diffusion-prisms, and the flaring mouth portion being practically covered with external reflecting-prisms arranged to reflect light-rays emanating within the reflector back through the open mouth.

3. A bell-mouthed shade-reflector composed of one piece of glass, and having a circular body portion substantially covered on its outer surface with diffusing-prisms arranged circumferentially, and its flaring bell-mouthed surface substantially covered by reflecting-prisms extending longitudinally and arranged to reflect light-rays emanating within the reflector back through the glass and out at the open mouth.

4. An integral shade-reflector of glass, having a neck portion beneath the collar provided with light-directing surfaces permitting the light-rays to pass through and out of the glass, and having a flaring mouth externally provided with reflecting-prisms having their axes extending in a generally radial direction, which prisms reflect light-rays received from within the reflector back into the reflector and out at the open mouth.

5. An integral shade-reflector of glass having a flaring mouth provided with means for reflecting light-rays from within, back and out at said open mouth, and having the upper body portion provided with means for directing and diffusing light-rays through the glass and out.

In testimony whereof I affix my signature in the presence of two witnesses.

OTIS A. MYGATT.

Witnesses:
E. M. MYGATT,
J. LANIER.